(12) United States Patent
Aoyagi et al.

(10) Patent No.: US 12,732,861 B2
(45) Date of Patent: Sep. 8, 2026

(54) ESTIMATING CONGESTION BASED ON BOTH COMMUNICATION AND NON-COMMUNICATION PERSPECTIVES

(71) Applicant: RAKUTEN MOBILE, INC., Tokyo (JP)

(72) Inventors: Kenichiro Aoyagi, Tokyo (JP); Jin Kusumi, Tokyo (JP); Takuya Miyazawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 299 days.

(21) Appl. No.: 18/572,184

(22) PCT Filed: Dec. 27, 2022

(86) PCT No.: PCT/JP2022/048284

§ 371 (c)(1),
(2) Date: Dec. 20, 2023

(87) PCT Pub. No.: WO2024/095502

PCT Pub. Date: May 10, 2024

(65) Prior Publication Data

US 2025/0097762 A1 Mar. 20, 2025

(30) Foreign Application Priority Data

Nov. 2, 2022 (JP) ................................ 2022-176218

(51) Int. Cl.
*H04W 28/02* (2009.01)
*H04W 4/90* (2018.01)
*H04W 84/06* (2009.01)

(52) U.S. Cl.
CPC ......... *H04W 28/0284* (2013.01); *H04W 4/90* (2018.02); *H04W 84/06* (2013.01)

(58) Field of Classification Search
CPC .... H04W 28/0284; H04W 4/90; H04W 84/06
See application file for complete search history.

(56) References Cited

U.S. PATENT DOCUMENTS

2011/0295577 A1 12/2011 Ramachandran
2014/0024399 A1 1/2014 Shimo et al.
(Continued)

FOREIGN PATENT DOCUMENTS

JP 2010278886 A 12/2010
JP 2014-022855 A 2/2014
(Continued)

OTHER PUBLICATIONS

NTT Docomo, NTT, Pseudo-CR on Use Case of crowd estimation in smart city [online], 3GPP TSG SA WG1 #99e SI-222094, Aug. 11, 2022, Retrieved from the Internet <URL:https://www.3gpp.org/ftp/tsg_sa/WG1_Serv/TSGS1_99e_EM_Aug2022/Docs/S1-222094,zip>, Aug. 11, 2022, 4pp.
(Continued)

*Primary Examiner* — Deepa Belur
(74) *Attorney, Agent, or Firm* — HAUPTMAN HAM, LLP

(57) ABSTRACT

A communication control apparatus includes at least one processor that performs: by a communication congestion detector, detecting congestion state of communications in a communication cell; by a congestion measurer, measuring congestion state of at least one of persons and objects in the communication cell; and by a congestion state estimator, estimating congestion state in the communication cell, based on the congestion state of communications detected by the communication congestion detector and the congestion state of at least one of the persons and the objects measured by the congestion measurer.

8 Claims, 2 Drawing Sheets

(56) References Cited

U.S. PATENT DOCUMENTS

| | | | | |
|---|---|---|---|---|
| 2014/0071831 | A1* | 3/2014 | Sinha | H04L 43/0882 370/241.1 |
| 2016/0321923 | A1* | 11/2016 | Seo | G08G 1/096791 |
| 2018/0279164 | A1* | 9/2018 | Miyai | H04W 24/08 |
| 2020/0175853 | A1* | 6/2020 | Xu | G06F 7/08 |
| 2021/0409972 | A1 | 12/2021 | Byrne | |
| 2022/0165150 | A1* | 5/2022 | Xu | G08G 1/0129 |
| 2022/0254162 | A1* | 8/2022 | Felemban | H04N 7/181 |

FOREIGN PATENT DOCUMENTS

| | | | |
|---|---|---|---|
| JP | 2015-127693 | A | 7/2015 |
| JP | 2019029033 | A | 2/2019 |
| WO | 2015079787 | A1 | 6/2015 |

OTHER PUBLICATIONS

Rakuten Mobile, Pseudo-CR Use case of sensing on Crowd Detection [online] , "3GPP TSG SA WG1 #100 SI-223587, Nov. 21, 2022", Retrieved from the Internet <URL:https://www.3gpp.org/ftp/tsg_sa/WG1_Serv/TSGS1_100_Toulouse/Docs/ SI-223587.zip>, Nov. 21, 2022, 3pp.

* cited by examiner 1
11
12
13
131
132
133
Core Network
EPC
5GC
RAT
LTE
5G NR
5G NR
5G NR
121
122
111A (111)
111B (111)
111C (111)
112A (112)
112B (112)
112C (112)
2A (2)
2B (2)
2C (2)
2D (2)

SERVICE PROVIDER
EMERGENCY AGENCY
STORE
SP
FIRST COMMUNICATION CARRIER
OP1
3
CONGESTION STATE SHARER
34
CONGESTION STATE ESTIMATOR
33
COMMUNICATION CONGESTION DETECTOR
31
CONGESTION MEASURER
32
SECOND COMMUNICATION CARRIER
OP2
CC1
CC2
BS1
BS2
SC1
SC2
SC3
4
4
4

ESTIMATING CONGESTION BASED ON BOTH COMMUNICATION AND NON-COMMUNICATION PERSPECTIVES

RELATED APPLICATIONS

The present application is a National Phase of International Application Number PCT/JP2022/048284, filed Dec. 27, 2022, and claims priorities based on Japanese Patent Application No. 2022-176218, filed Nov. 2, 2022.

BACKGROUND OF THE INVENTION

1. Field of the Invention

The present disclosure relates to estimating congestion based on both communication and non-communication perspectives.

2. Description of the Related Art

The number, types, and applications of wireless communication devices (hereinafter also collectively referred to as communication devices), represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Patent Literature 1: JP-A-2010-278886

SUMMARY OF THE INVENTION

In order to optimize communications in each communication cell, communication traffic, which represents the congestion state of communications in each communication cell, is monitored on a regular basis. However, the communication traffic does not necessarily represent the actual congestion state of persons or objects in each communication cell. This is because the monitoring of the communication traffic is usually performed individually by each different communication carrier, and the communication traffic of a communication carrier different from itself is not easily accessible. Besides, persons or objects that are located in each communication cell but not actually communicating, cannot be monitored properly because they are not visible in the form of communication traffic.

The present disclosure was made in consideration of this situation, and its purpose is to provide a communication control apparatus and the like that can effectively estimate congestion state in a communication cell.

A communication control apparatus in a certain aspect of the present disclosure includes at least one processor that performs: by a communication congestion detector, detecting congestion state of communications in a communication cell; by a congestion measurer, measuring congestion state of at least one of persons and objects in the communication cell; and by a congestion state estimator, estimating congestion state in the communication cell, based on the congestion state of communications detected by the communication congestion detector and the congestion state of at least one of the persons and the objects measured by the congestion measurer.

According to the present aspect, based on the congestion state of communications detected by the communication congestion detector (hereinafter also referred to as the congestion state in the "communication perspective") and the congestion state of at least one of persons and objects measured by the congestion measurer (hereinafter also referred to as the congestion state in the "non-communication perspective"), the congestion state in a communication cell can be effectively estimated.

Another aspect of the present disclosure is a communication control method. The communication control method performs: detecting congestion state of communications in a communication cell; measuring congestion state of at least one of persons and objects in the communication cell; and estimating congestion state in the communication cell, based on the detected congestion state of communications and the measured congestion state of at least one of the persons and the objects.

Further another aspect of the present disclosure is a computer-readable medium. The medium stores a communication control program causing a computer to perform: detecting congestion state of communications in a communication cell; measuring congestion state of at least one of persons and objects in the communication cell; and estimating congestion state in the communication cell, based on the detected congestion state of communications and the measured congestion state of at least one of the persons and the objects.

In addition, any combination of the above components, and any conversion of the expression of the present disclosure among methods, devices, systems, recording media, computer programs and the like are also encompassed within this disclosure.

According to the present disclosure, congestion state in a communication cell can be effectively estimated.

DETAILED DESCRIPTION OF THE INVENTION

Figure 1:
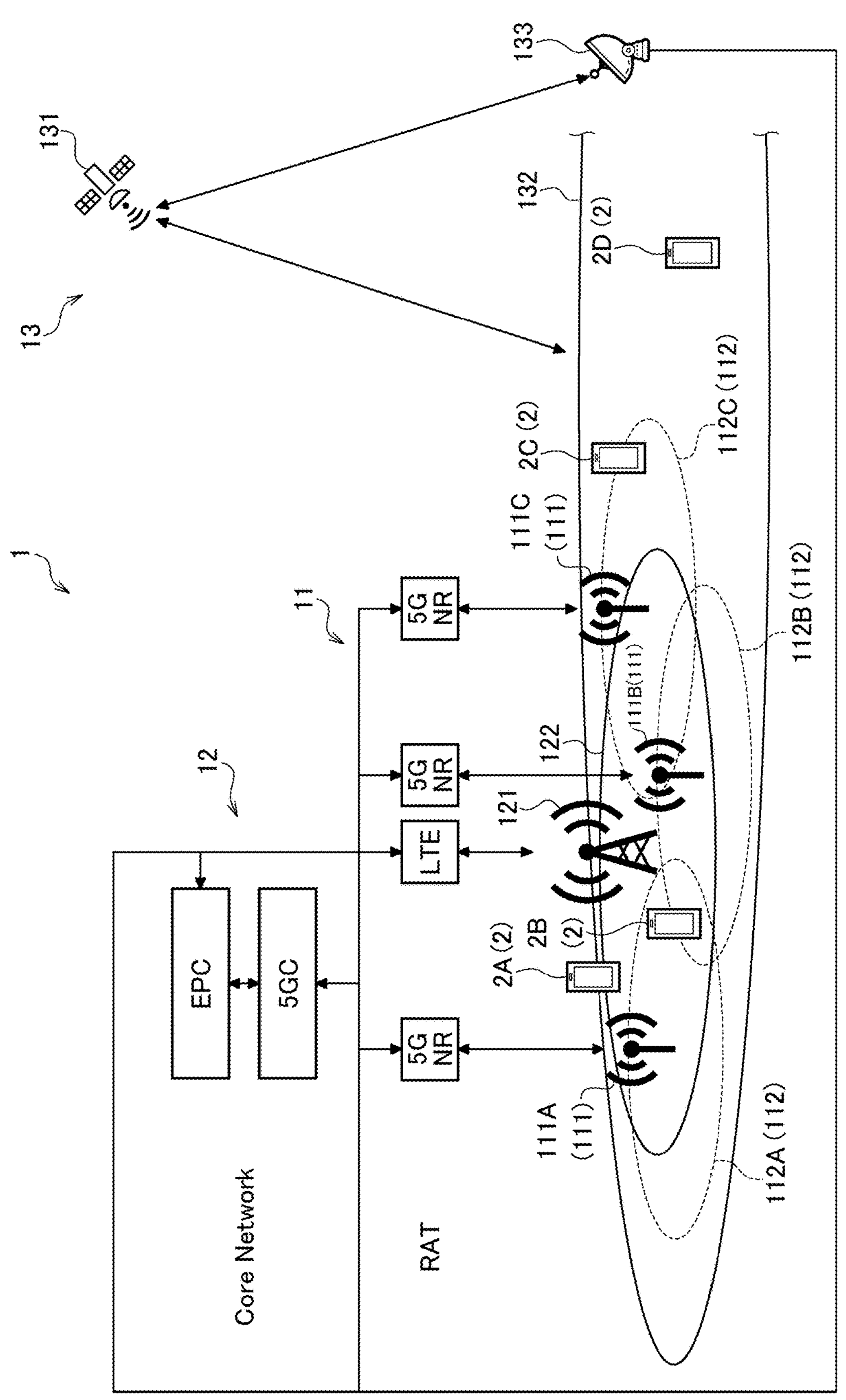
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is responsible for satellite communication via communication satellite 131. Although not shown in the figure, the wireless communication system 1 may include wireless communication networks of a generation prior to 4G, a generation later than 5G (e.g., 6G), or any wireless communication networks that are not associated with generations, such as Wi-Fi (registered trademark).

The 5G wireless communication system 11 may include a plurality of 5G base stations 111A, 111B, and 111C (hereinafter also collectively referred to as 5G base station 111) installed on the ground capable of communicating by 5G NR with communication devices or communication devices 2A, 2B, 2C, and 2D (hereinafter also collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter also collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1). The plurality of 4G base stations 121 are installed on the ground and can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In this way, the gateway 133 connects the non-terrestrial network (NTN), which is including communication satellites 131 as a non-terrestrial base station or a satellite base station, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In this way, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft or a drone flying in stratosphere or other lower (e.g., about 20 km above the ground) atmosphere may be used as a non-terrestrial base station in addition to or instead of the communication satellite 131.

Figure 2:
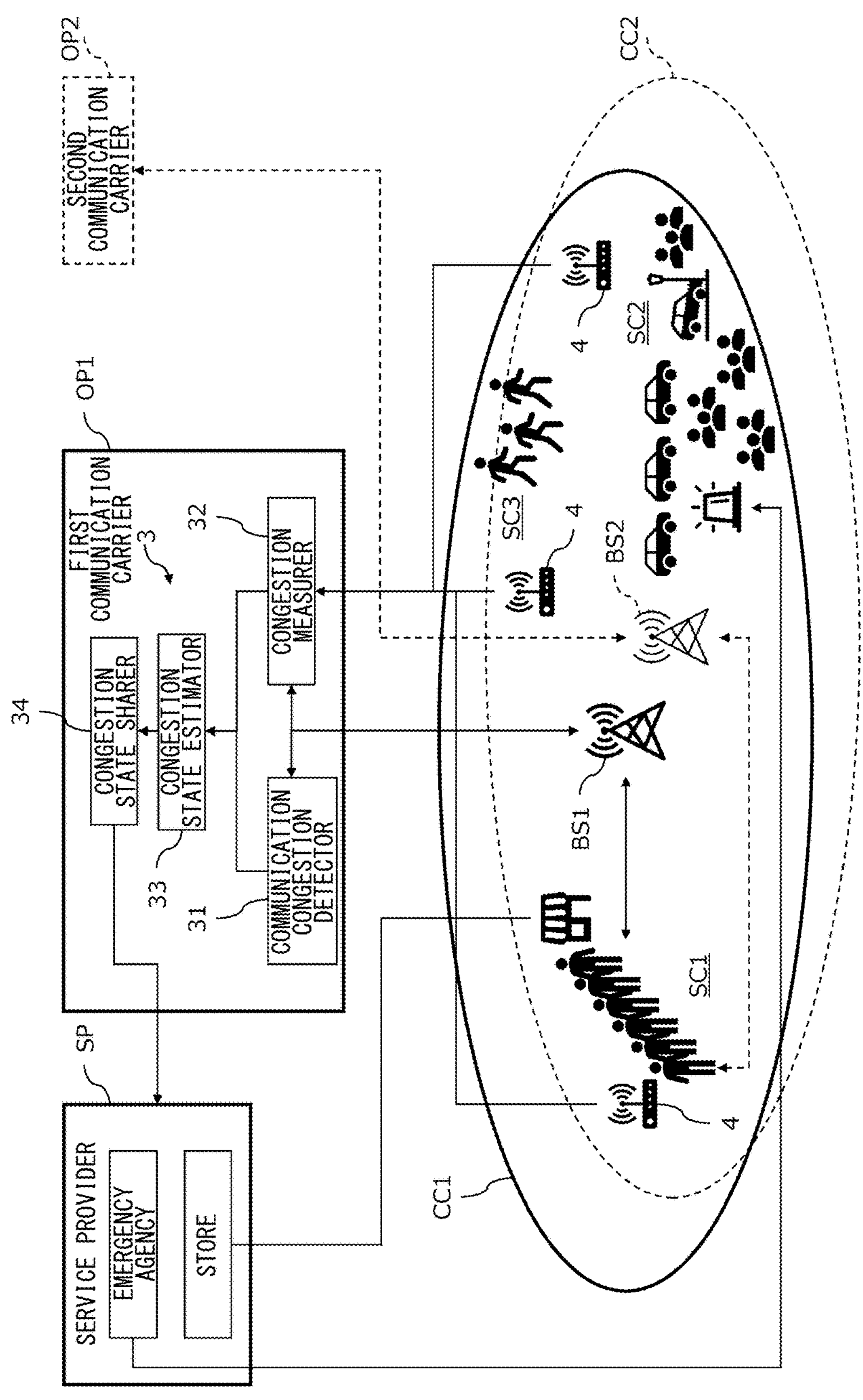
FIG. 2 is a functional block diagram of the communication control apparatus.

FIG. 2 is a functional block diagram of the communication control apparatus 3 according to the present embodiment. The communication control apparatus 3 includes a communication congestion detector 31, a congestion measurer 32, a congestion state estimator 33, and a congestion state sharer 34. Some of these functional blocks can be omitted as long as the communication control apparatus 3 realizes at least some of the operations and/or effects described below. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the present embodiment, some or all of functional blocks of the communication control apparatus 3 may be realized in a centralized or distributed manner by computer and/or processor provided in the communication device 2, the sensor unit 4 described below, the base station 111, 121, 131 (the distributed unit and/or the central unit), the gateway 133, and the core network CN.

In the example of the present embodiment, many of the functions of the communication control apparatus 3 are realized on the first mobile communication network provided by the first communication carrier OP1. The first base station BS1 (e.g., the 5G base station 111) that belongs to the first mobile communication network, provides the first communication cell CC1 (e.g., the 5G cell 112). Besides, the second communication carrier OP2, which is different from the first communication carrier OP1, provides the second mobile communication network, which is different from the first mobile communication network. The second base station BS2 (e.g., the 5G base station 111) that belongs to the second mobile communication network, provides the second communication cell CC2 (e.g., the 5G cell 112). As illustrated in the figure, in the example of the present embodiment, the first communication cell CC1 provided by the first base station BS1 and the second communication cell CC2 provided by the second base station BS2 cover approximately the same area on the ground.

The communication congestion detector 31 under the control of the first communication carrier OP1 detects the congestion state of communications of at least the first communication carrier OP1 in the first communication cell CC1 provided by the first base station BS1. Specifically, the communication congestion detector 31 detects the traffic of the first communications performed by the communication devices 2 (not shown in FIG. 2) being connected to the first base station BS1 in the first communication cell CC1, which can communicate on the first mobile communication network based on communication service agreements with the first communication carrier OP1 (hereinafter also referred to as the first communication devices 2). On the other hand, the communication congestion detector 31 under the control of the first communication carrier OP1 cannot detect, for example, the traffic of the second communications performed by the communication devices 2 being connected to the second base station BS2 in the first communication cell CC1, which do not have communication service agreements with the first communication carrier OP1 but can communicate on the second mobile communication network based on communication service agreements with the second communication carrier OP2 (hereinafter also referred to as the second communication devices 2).

Thus, the communication congestion detector 31 that belongs to a specific mobile communication network (the first mobile communication network) cannot detect the traffic of all communication devices 2 in the communication cell (the first communication cell CC1). For example, it cannot directly detect the communication traffic on other mobile communication networks (e.g., the second mobile communication network). Therefore, the communication traffic on the first mobile communication network detected by the communication congestion detector 31 is only fragmented information indicating the actual congestion state of persons or objects in the first communication cell CC1 as a physical or geographical area. Besides, persons who do not have communication devices 2 for mobile communication or objects that do not have mobile communication capability (e.g., automobiles), do not generate communication traffic, and therefore cannot be detected by the communication congestion detector 31 even if they are in the first communication cell CC1.

In order to compensate for such fragmented "communication perspective" congestion state detected by the communication congestion detector 31 related only to the first mobile communication network, the present embodiment also utilizes the congestion state from the "non-communication perspective" measured by the congestion measurer 32. The "non-communication perspective" means that the measurement of congestion state by the congestion measurer 32 is not based on communications between measurement targets and the first base station BS1. On the other hand, the "communication perspective" means that the detection of congestion state (i.e., communication traffic) by the communication congestion detector 31 is based on communications between the first communication devices 2 (detection targets) and the first base station BS1, as described above. The congestion measurer 32 measures the congestion state of at least one of persons and objects (the first communication devices 2 that can be detected by the communication congestion detector 31 may be excluded) in the first communication cell CC1. For example, the congestion measurer 32 measures the congestion state of at least one of persons and objects (e.g., the second communication devices 2) that communicates through at least the second communication carrier OP2 in the first communication cell CC1.

The measurement from the non-communication perspective by the congestion measurer 32 may be performed through the communication radio waves of the first base station BS1 that provides the first communication cell CC1. For example, the communication radio waves transmitted by the first base station BS1 are reflected by persons or objects (or a group of them) as the measurement targets. Therefore, the first base station BS1 or sensors such as the sensor units 4 described below, which are located at various locations in the first communication cell CC1 (preferably in the vicinities of the measurement targets), can detect the measurement targets by measuring the communication radio waves reflected by the measurement targets. It should be noted that, although the measurement utilizes communication radio wave, it is classified as a measurement from the "non-communication perspective" because it is not based on communications between the measurement targets and the first base station BS1 (and/or sensors), but on the physical properties of communication radio wave as electromagnetic wave.

Besides, the measurement from the non-communication perspective by the congestion measurer 32 may be based on the communication quality measured by the first communication devices 2 on the first mobile communication network whose communication traffic is detected by the communication congestion detector 31. The first communication devices 2 regularly measure the communication quality, such as the strength or quality of communication radio waves received from the first base station BS1. For example, if there are many other first communication devices 2 or second communication devices 2 around the specific first communication device 2, the communication quality measured by the specific first communication device 2 (on the first mobile network) may change or deteriorate due to interference or other effects from the communications they (the other first communication devices 2 or second communication devices 2) perform on the first mobile communication network or the second mobile communication network. In such a case, the change in communication quality detected by the specific first communication device 2 indirectly indicates the congestion state around the specific first communication device 2. It should be noted that, although the measurement also utilizes communication radio wave of the first base station BS1, it is classified as a measurement from the "non-communication perspective" because it is not based on communications between the second communication devices 2 and the like as the main measurement targets and the first base station BS1 (it is based on communication between the first communication device 2 (not the main measurement target here) and the first base station BS1).

The above "non-communication perspective" measurement performed through the communication radio waves of the first base station BS1, can be made more accurate by utilizing small communication cells (base stations) such as femtocells. Besides, high-frequency communication radio waves with high straightness or directivity such as millimeter waves, can easily capture the relationship between irradiation and reflection at the measurement targets, thus enabling highly accurate measurement from the "non-communication perspective.

The measurement from the non-communication perspective by the congestion measurer 32 may be performed through sensors such as the sensor units 4, which are located at various locations in the first communication cell CC1. The sensors including the sensor units 4, acquire any measurement information indicating the congestion state of persons or objects in the first communication cell CC1 and provide it to the congestion measurer 32 through the first mobile communication network.

For example, the sensor may be an image sensor such as a camera. In such a case, the congestion measurer 32 or the congestion state estimator 33 described below, which can utilize various image recognition technologies, can detect the congestion state based on an image captured by the image sensor. Similarly, the sensor may be a voice sensor such as a microphone. In such a case, the congestion measurer 32 or the congestion state estimator 33 described below, which can utilize various voice recognition technologies, can detect the congestion state based on a voice acquired by the voice sensor.

Besides, the sensor may be a temperature sensor, a humidity sensor, an electrical sensor, a magnetic sensor, an optical sensor, a mechanical sensor, an acoustic sensor, a chemical sensor, a biological sensor, or other sensors that measure physical quantities, chemical quantities, or biological quantities that directly or indirectly indicate various states of the area under measurement. If the measurement values of such various sensors are significantly out of the range that can be taken during normal times or times without congestions, the congestion measurer 32 or the congestion state estimator 33 described below may determine that the area under measurement is congested.

Furthermore, the sensor may acquire communication measurement information such as communication quality, traffic volume, or communication type in mobile communication network (the first mobile communication network and/or the second mobile communication network). For example, if the traffic volume at a specific location increases more rapidly than at other locations, the congestion measurer 32 or the congestion state estimator 33 described below may determine that the specific location is congested. Besides, if emergency communications such as emergency calls are occurring intensively at a specific location, the congestion measurer 32 or the congestion state estimator 33 described below may determine that the specific location is congested as a result of some emergencies taking place there.

The various sensors described above are distributed in various ways or forms on mobile communication network (in particular, the first mobile communication network), specifically in the first communication cell CC1.

At least some of the sensors may be provided in a communication device 2 that can communicate with the mobile communication network (in particular, the first mobile communication network). In this case, the various sensor functions provided in the general-purpose communication device 2 such as a smartphone, constitute each sensor. Specifically, recent smartphones, for example, are equipped with sensor functions for image sensors (cameras), voice sensors (microphones), temperature sensors, acceleration sensors (inertial sensors), position sensors (the GPS and the like), and biometric sensors (to measure heart rate or blood pressure). Besides, communication devices 2 such as smartphones are standardly equipped with various communication measurement (communication sensor) functions for mobile communication with mobile communication networks. Specifically, a communication device 2 functioning as a communication sensor measures the communication quality and the like at its own position and provides it to the base station (in particular, the first base station BS1) in the form of channel state information (CSI) and the like.

At least some of the sensors may be provided in a communication station that constitutes the mobile communication network and can communicate with a communication device 2. Here, the mobile communication network means the entire network including the radio access network (RAN) including various base stations 111, 121, 131 as illustrated in FIG. 1, and the core network. Besides, the communication station mainly constitutes the RAN, and specific examples include various base stations 111, 121, 131, IAB (Integrated Access and Backhaul) nodes, and relay stations. Each communication station can be equipped with one or more sensors of any type.

At least some of the sensors may be provided as sensor units 4 that can communicate directly or indirectly with communication stations (base stations, IAB nodes, relay stations and the like) that constitute the mobile communication network, or directly or indirectly with the RAN. It should be noted that the sensor units 4 may be provided in a movable object such as a vehicle or any other objects equipped with communication functions. These sensor units 4 do not need to be equipped with advanced communication functions like a general-purpose communication device 2 such as a smartphone, but may be like an IoT device with minimal communication functions that can share measurement results to the RAN and/or the core network. Besides, the sensor unit 4 may utilize short-range wireless communication technologies such as Bluetooth (trademark) to provide measurement results to nearby communication devices 2, communication stations, other sensor units 4 and the like, and from there relaying or providing them to the RAN and/or the core network as necessary.

The wide variety of sensors described above constitute a sensor network by being interconnected or coupled via a mobile communication network (especially RAN). The function of the congestion measurer 32 or the congestion state estimator 33 described below, which collects measurement information of various sensors from such a sensor network, may be realized by at least a portion of the AI (Artificial Intelligence)/ML (Machine Learning) functions responsible for collecting and/or analyzing data on a mobile communication network such as the NWDAF (Network Data Analytics Function). Such AI/ML functions and other data processing functions are typically realized in the core network, but may be realized at least in part by an edge server provided closer to a communication device 2 than the core network. The technology for distributing and expediting processes by utilizing such an edge server is also called the multi-access edge computing (MEC). Besides, the data processing functions available for the congestion measurer 32 or the congestion state estimator 33 described below and the like may be realized at least in part in the user plane function (UPF) in the core network.

The congestion state estimator 33 estimates the actual congestion state in the first communication cell CC1, based on the congestion state from the "communication perspective" within the first mobile communication network detected by the communication congestion detector 31 (i.e., the communication traffic on the first mobile communication network and the like), and the congestion state from the "non-communication perspective" outside the first mobile communication network measured by the congestion measurer 32 (e.g., the congestion state of persons or objects related to the second communication carrier OP2). In other words, the congestion state estimator 33 estimates the physical congestion state in the first communication cell CC1 by comprehensively considering the congestion states from the "communication perspective" and the "non-communication perspective".

As mentioned above, the data analysis function by the congestion state estimator 33 may be realized, for example, by the NWDAF introduced in the 5GC as the core network of 5G, or other AI/ML functions. The NWDAF is responsible for collecting and analyzing data on the network including 5G. Specifically, the NWDAF collects and accumulates measurement information of sensors such as a large number of communication devices 2, communication stations (base stations, IAB nodes, relay stations and the like), sensor units 4 connected to the mobile communication network, and utilizes the analysis results for traffic control on the mobile communication network, for example. It should be noted that, in other wireless communication systems, including those of later generations than 5G, functions similar to the NWDAF might be provided under different names. Such similar functions may be utilized in the present embodiment instead of or in addition to the NWDAF. Besides, as mentioned above, the data processing function in the congestion state estimator 33 may be realized in an edge server capable of executing the MEC.

The congestion state sharer 34 shares the congestion state in the first communication cell CC1 estimated by the congestion state estimator 33, with the service provider SP that provides a service in the first communication cell CC1. The function of sharing information or disclosing information outside of the first communication carrier OP1 in the congestion state sharer 34, may be realized by the NEF (Network Exposure Function) that provides an application programming interface (API) to various functions in the 5GC. It should be noted that, the congestion state sharer 34 may distribute or disclose the congestion state in the first communication cell CC1 estimated by the congestion state estimator 33, on the first mobile communication network or on a general network such as the Internet, or the congestion state sharer 34 may display such congestion state on a digital signage installed in the first communication cell CC1.

The congestion state sharer 34 may share the congestion state with the service provider SP that provides a service at a store in the first communication cell CC1. Examples of the store include a shop, a commercial facility, and a restaurant. In the first scene SC1 schematically shown in FIG. 2, a large number of persons are lined up in front of a restaurant, forming a queue. Since persons waiting in a queue tend to spend time looking at their smartphones and other devices at hand, a relatively large volume of communication traffic is generated in the first scene SC1. Among the whole communication traffic, the communication traffic on the first mobile communication network is detected by the communication congestion detector 31. Besides, the congestion measurer 32 directly or indirectly measures the large number of persons lined up in front of the restaurant.

Then, the congestion state estimator 33 determines that the area around the restaurant is actually congested, based on the detection result from the communication perspective by the communication congestion detector 31 that the large volume of communication traffic is generated in the vicinity of the restaurant, and the measurement result from the non-communication perspective by the congestion measurer 32 that the large number of persons are lined up in front of the restaurant. Furthermore, the congestion state estimator 33 may recognize that the congestion around the restaurant is caused by the persons queuing, or may recognize the state where the persons in the queue are waiting for a long time. Such congestion state around a store, the cause of the congestion, or the state of persons or objects causing the congestion, are shared with the store by the congestion state sharer 34, leading to various actions taken against the congestion. For example, a store can distribute coupons over a mobile communication network (the first mobile communication network and/or the second mobile communication network) that can be used at the store, in order to ease the frustrations of the persons waiting in the queue.

The congestion state sharer 34 may share the congestion state with an emergency agency that provides an emergency service in response to the congestion state in the first communication cell CC1. Examples of the emergency agency include a public agency such as a police agency, a fire agency, and a coast guard agency. It should be noted that, the emergency agency may be a non-public agency as well as a public agency. For example, a management organization or an interested organization of the place or the facility where the congestion estimated by the congestion state estimator 33 is taking place, or an organization affected in some way by such congestion, and the like, may function as an emergency agency and accept the sharing of the congestion state from the congestion state sharer 34.

In the second scene SC2 schematically shown in FIG. 2, a large number of persons are gathered around the scene of a car accident and a large number of other cars are congested. Since the large number of persons, including those in the other cars caught up in the traffic congestion, use the communication devices 2 for reporting, checking information concerning the accident, and the like, a large volume of communication traffic is generated in the second scene SC2. Among the whole communication traffic, the communication traffic on the first mobile communication network is detected by the communication congestion detector 31. Besides, the congestion measurer 32 directly or indirectly measures the large number of persons or cars around the scene of the accident.

Then, the congestion state estimator 33 determines that the area around the accident scene is actually congested, based on the detection result from the communication perspective by the communication congestion detector 31 that the large volume of communication traffic is generated in the vicinity of the accident scene, and the measurement result from the non-communication perspective by the congestion measurer 32 that the large number of persons or cars are gathered around the accident scene. Furthermore, the congestion state estimator 33 may recognize that the congestion around the accident scene is caused by the car accident, or may recognize the state such as facial expressions or movements of the persons gathered around the accident scene. Such congestion state around the accident scene, the cause of the accident, or the state of persons or objects causing the congestion, are shared with each emergency agency by the congestion state sharer 34, leading to various actions taken against the accident or the congestion. For example, a police agency as an emergency agency can quickly dispatch police officers to the accident scene.

In the third scene SC3 schematically shown in FIG. 2, a large number of persons are moving in a group. Since these moving persons are not using the communication devices 2, no significant communication traffic is generated. Therefore, the communication congestion detector 31 does not detect any communication congestion on the first mobile communication network. On the other hand, the congestion measurer 32 detects the physical congestion by directly or indirectly measuring the large number of persons moving in a group.

Then, the congestion state estimator 33 determines that the physical congestion that does not substantially affect the first mobile communication network is temporarily taking place by the large number of persons, based on the detection result from the communication perspective by the communication congestion detector 31 that the communication traffic on the first mobile communication network is small (without significant increase), and the measurement result from the non-communication perspective by the congestion measurer 32 that the large number of persons are moving in a group. In other words, the congestion state estimator 33 determines the state of "moving without mobile communication" of the large number of persons as measured by the congestion measurer 32. As such, the congestion state estimator 33 may determine the state of at least one of the persons and the objects measured by the congestion measurer 32. The states that can be determined by the congestion state estimator 33 (and/or the states that can be measured by the congestion measurer 32) may include the presence, the position, the posture, and the movement (the speed or the acceleration) of the person or the object to be determined.

As described above, the congestion state estimator 33, which holistically estimates the actual congestion state in the first communication cell CC1 based on the congestion states from the "communication perspective" and the "non-communication perspective", can analyze in detail the congestion state from the "communication perspective" and/or the "non-communication perspective". For example, if the communication traffic detected by the communication congestion detector 31 is significantly lower than expected, even though an extremely large number of persons are measured by the congestion measurer 32, it is suspected that some communication disorders are taking place in the mobile communication network. On the other hand, if a large volume of communication traffic is detected by the communication congestion detector 31, but persons or objects causing the communication traffic are not measured by the congestion measurer 32, it is suspected that the communication congestion detector 31 and/or the congestion measurer 32 are not functioning properly.

According to the embodiment described above, the actual congestion state in the first communication cell CC1 can be effectively estimated by the congestion state estimator 33, based on the congestion state from the "communication perspective" detected by the communication congestion detector 31 and the congestion state from the "non-communication perspective" measured by the congestion measurer 32.

In particular, by using the communication congestion detector 31, which detects the congestion state closed to the first communication carrier OP1, together with the congestion measurer 32, which measures the congestion state not closed to the first communication carrier OP1, the congestion state estimator 33 can estimate the actual congestion state across the different communication carriers. Then, the congestion state sharer 34 can share such a highly objective congestion state, which is not restricted to a specific communication carrier, with various service providers SP. This can also bring about expansion or quality improvement of services by service providers SP.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A communication control apparatus comprising at least one processor that performs:
   - by a communication congestion detector, detecting congestion state of communications in a communication cell;
   - by a congestion measurer, measuring congestion state of at least one of persons and objects in the communication cell; and
   - by a congestion state estimator, estimating congestion state in the communication cell, based on the congestion state of communications detected by the communication congestion detector and the congestion state of at least one of the persons and the objects measured by the congestion measurer.
2. The communication control apparatus according to item 1, wherein the at least one processor performs, by a congestion state sharer, sharing the congestion state in the communication cell estimated by the congestion state estimator with a service provider that provides a service in the communication cell.
3. The communication control apparatus according to item 2, wherein the service provider includes an emergency agency that provides an emergency service in response to the congestion state in the communication cell.
4. The communication control apparatus according to item 2 or 3, wherein the service provider provides the service at a store in the communication cell.
5. The communication control apparatus according to any of items 1 to 4, wherein the congestion state estimator determines the state of at least one of the persons and the objects measured by the congestion measurer.
6. The communication control apparatus according to any of items 1 to 5, wherein
   - the communication cell is a first communication cell provided by a first communication carrier,
   - the communication congestion detector detects the congestion state of the communications of at least the first communication carrier in the first communication cell,
   - the congestion measurer measures the congestion state of at least one of the persons and the objects that communicate through at least a second communication carrier different from the first communication carrier in the first communication cell, and
   - the congestion state estimator estimates the congestion state in the first communication cell, based on the congestion state of communications of at least the first communication carrier detected by the communication congestion detector and the congestion state of at least one of the persons and the objects related to at least the second communication carrier measured by the congestion measurer.
7. The communication control apparatus according to any of items 1 to 6, wherein the congestion measurer measures the congestion state of at least one of the persons and the objects in the communication cell, through the communication radio wave of a base station that provides the communication cell.
8. A communication control method performing:
   - detecting congestion state of communications in a communication cell;
   - measuring congestion state of at least one of persons and objects in the communication cell; and
   - estimating congestion state in the communication cell, based on the detected congestion state of communications and the measured congestion state of at least one of the persons and the objects.
9. A computer-readable medium storing a communication control program causing a computer to perform:
   - detecting congestion state of communications in a communication cell;
   - measuring congestion state of at least one of persons and objects in the communication cell; and
   - estimating congestion state in the communication cell, based on the detected congestion state of communications and the measured congestion state of at least one of the persons and the objects.

The application claims priority of Japanese patent application 2022-176218, filed on Nov. 2, 2022, which is hereby incorporated by reference in its entirety.

The present disclosure relates to estimating congestion based on both communication and non-communication perspectives.

1 wireless communication system, 2 communication device, 3 communication control apparatus, 4 sensor unit, 11 5G wireless communication system, 12 4G wireless communication system, 13 satellite communication system, 31 communication congestion detector, 32 congestion measurer, 33 congestion state estimator, 34 congestion state sharer, 111 5G base station, 112 5G cell, 121 4G base station, 122 4G cell, 131 communication satellite, 132 satellite communication cell, 133 gateway, OP1 first communication carrier, OP2 second communication carrier.

What is claimed is:

1. A communication control apparatus comprising at least one processor that performs:

by a communication congestion detector, detecting congestion state of communications in a communication cell;

by a congestion measurer, measuring congestion state of at least one of persons and objects in the communication cell; and by a congestion state estimator, estimating congestion state in the communication cell, based on the congestion state of communications detected by the communication congestion detector and the congestion state of at least one of the persons and the objects measured by the congestion measurer, wherein the communication cell is a first communication cell provided by a first communication carrier, the communication congestion detector detects the congestion state of the communications of at least the first communication carrier in the first communication cell, the congestion measurer measures the congestion state of at least one of the persons and the objects that communicate through at least a second communication carrier different from the first communication carrier in the first communication cell, and the congestion state estimator estimates the congestion state in the first communication cell, based on the congestion state of communications of at least the first communication carrier detected by the communication congestion detector and the congestion state of at least one of the persons and the objects related to at least the second communication carrier measured by the congestion measurer.

2. The communication control apparatus according to claim 1, wherein the at least one processor performs, by a congestion state sharer, sharing the congestion state in the communication cell estimated by the congestion state estimator with a service provider that provides a service in the communication cell.

3. The communication control apparatus according to claim 2, wherein the service provider includes an emergency agency that provides an emergency service in response to the congestion state in the communication cell.

4. The communication control apparatus according to claim 2, wherein the service provider provides the service at a store in the communication cell.

5. The communication control apparatus according to claim 1, wherein the congestion state estimator determines the state of at least one of the persons and the objects measured by the congestion measurer.

6. The communication control apparatus according to claim 1, wherein the congestion measurer measures the congestion state of at least one of the persons and the objects in the communication cell, through the communication radio wave of a base station that provides the communication cell.

7. A communication control method performing:

detecting congestion state of communications in a communication cell;

measuring congestion state of at least one of persons and objects in the communication cell; and estimating congestion state in the communication cell, based on the detected congestion state of communications and the measured congestion state of at least one of the persons and the objects, wherein the communication cell is a first communication cell provided by a first communication carrier, the detecting detects the congestion state of the communications of at least the first communication carrier in the first communication cell, the measuring measures the congestion state of at least one of the persons and the objects that communicate through at least a second communication carrier different from the first communication carrier in the first communication cell, and the estimating estimates the congestion state in the first communication cell, based on the congestion state of communications of at least the first communication carrier and the congestion state of at least one of the persons and the objects related to at least the second communication carrier.

8. A non-transitory computer-readable medium storing a communication control program causing a computer to perform:

detecting congestion state of communications in a communication cell;

measuring congestion state of at least one of persons and objects in the communication cell; and estimating congestion state in the communication cell, based on the detected congestion state of communications and the measured congestion state of at least one of the persons and the objects, wherein the communication cell is a first communication cell provided by a first communication carrier, the detecting detects the congestion state of the communications of at least the first communication carrier in the first communication cell, the measuring measures the congestion state of at least one of the persons and the objects that communicate through at least a second communication carrier different from the first communication carrier in the first communication cell, and the estimating estimates the congestion state in the first communication cell, based on the congestion state of communications of at least the first communication carrier and the congestion state of at least one of the persons and the objects related to at least the second communication carrier.

* * * * *